E. E. NOVOTNY.
MANUFACTURE OF PHONOGRAPHIC ARTICLES.
APPLICATION FILED FEB. 9, 1920.
1,404,792. Patented Jan. 31, 1922.
Fig. 1,
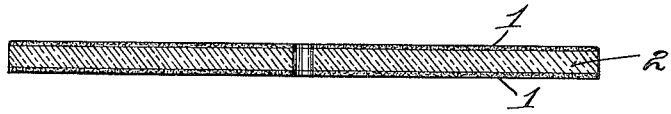
Fig. 2,
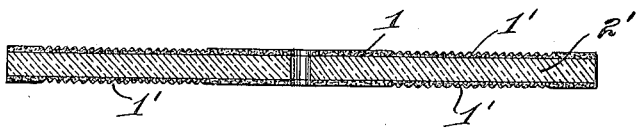
Fig. 3,
Fig. 4,
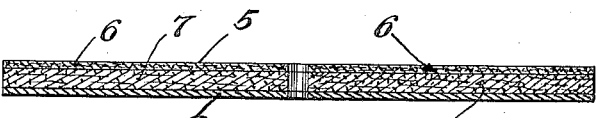
Fig. 5,
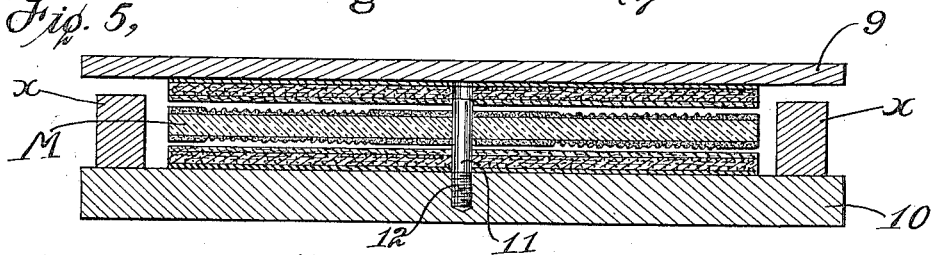
Fig. 6,
Fig. 7,
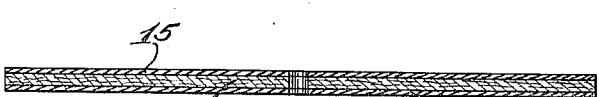
Fig. 8,
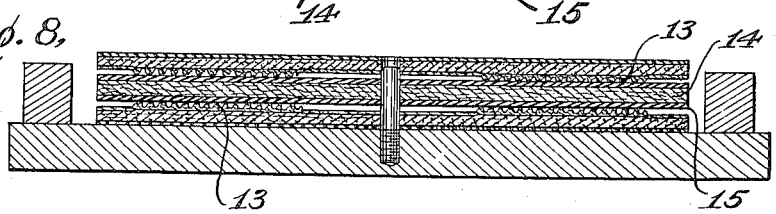
Fig. 9,
Fig. 10,
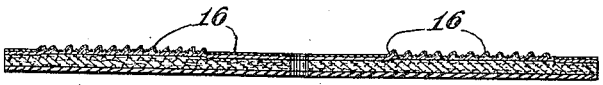
Inventor
Emil E Novotny
By his Attorneys.
Meyers, Cavanagh & Hyde

UNITED STATES PATENT OFFICE.

EMIL E. NOVOTNY, OF LOGAN, PENNSYLVANIA, ASSIGNOR TO JOHN STOGDELL STOKES, OF PHILADELPHIA, PENNSYLVANIA.

MANUFACTURE OF PHONOGRAPHIC ARTICLES.

1,404,792.           Specification of Letters Patent.     Patented Jan. 31, 1922.

Application filed February 9, 1920. Serial No. 357,121.

*To all whom it may concern:*

Be it known that I, EMIL E. NOVOTNY, a citizen of the United States, and resident of Logan, in the county of Philadelphia and State of Pennsylvania, have invented certain new and useful Improvements in the Manufacture of Phonographic Articles, of which the following is a specification.

This invention relates to the manufacture of phonographic articles such as master records, punches or matrices, and records.

In the present instance my invention has particular application to the molding of such phonographic articles from various plastic or semi-plastic materials such for example as synthetic resins of creasol and phenol; paracumerone resins such as shellac, gum-copal and rubber; albumenoids, and other organic materials such as asphalts, tar, celluloid and various oxidizable oils.

In the practice of my invention I prefer to use synthetic resins in the nature of phenolic condensation products, such as those commercially known as bakelite and condensite.

The reason for my preference for a synthetic resin, such as a phenolic condensation product, is that this material may be so blended or mixed with other substances that it will form a composition which will remain plastic without flow; which will not adhere to the material molded against and so precooked in the expanded open fibrous structure that it offers resistance to pressure and holds its expanded form but can be compressed readily when warm; thus enabling accurate reproductions of an original to be molded without requiring the use of expensive enclosed casting boxes and dies for the dual purpose of maintaining pressure and restricting the side flow of the material. Furthermore, it is possible to so blend or mix the phenolic condensation product with other substances that resultant material will assume a wax-like consistency enabling the recorder point to make a perfect record of the selection to be reproduced and such record may be subsequently so treated as to assume a hardened and set condition. In such condition the record may be used to reproduce a master punch or matrix without resorting to electrotype of other supplementary operations, and of course this master punch or matrix may subsequently be used to mold any desired number of commercial records.

Of course, articles made from these phenolic condensation products possess the attributes of hardness and durability thereby enabling them to withstand the wear incident to continuous use in shipment and storage. As these records are sold in large quantities the saturation with phenolic condensation products of powdery fillers is very expensive and necessitates slow molding with my compressible, low impregnated, expanded precooked material having a non-penetrating and relatively higher phenolic skin, I save a large part of the material and mold by compression enabling the production of several casts a minute.

In the accompanying drawings:

Figure 1, is a cross sectional view of a blank to be used in the production of a master record.

Figure 2, is a similar view of a master record blank wherein grooves have been molded in the record prior to the recording of the sound waves.

Figure 3, is a cross sectional view of a master record with the sound waves recorded on both faces thereof as in producing a two-selection master record.

Figure 4, is a cross sectional view of a blank which may be employed for producing a master punch or matrix from a master record.

Figure 5, is a cross sectional view taken through a conventional form of press and illustrating the manner of producing two master punches or matrices at one operation.

Figure 6, is a cross sectional view of a completed punch or matrix.

Figure 7, is a cross sectional view of a blank for making a commercial record from the punch or matrix shown in Figure 6.

Figure 8, is a cross sectional view showing the manner of producing the commercial records from a punch or matrix illustrated in Figure 6.

Figure 9, is a cross sectional view through a completed commercial record having a selection recorded on each face thereof.

Figure 10, is a sectional view of a modified matrix.

Referring now to Figure 1 of the drawings which shows a blank for producing the master record upon which the selection is recorded by the usual cutting point, the faces of such blank, shown at 1, are in the nature of wax-like phenolic coatings supported by disc-like body 2, which is preferably composed of metallic or ceramic or other heat-retaining material, porcelain being very useful for this purpose. In making each facing 1 of the blank it is desirable to use a substance which will readily permit the cutting or recording of the sound waves and which will also be strong and hard enough, in finished condition, to permit the punch or matrix to be molded directly therefrom. For these facings 1, I therefore prefer to use a reaction product of phenol and formaldehyde. It is also preferable to use benzol as the solvent in place of alcohol ordinarily employed, as benzol will remain in the phenol for long periods of time after the facings or coatings have been treated to produce skin-like surface, but such benzol at later stages in the treatment of the article will readily disappear without leaving water behind, as is likely to occur when alcohol is used as the solvent.

As an example I may use a phenolic condensation product reacted but partially resulting in a low melting point of say 100° F. The mixture consists of the following:

1 part phenolic condensation gum.
⅓ part acetone.
⅓ part phenolic solid solvent.
4 parts silex—the name of a very pure and extremely fine silica.

In preparing the mixture the phenolic gum is cut in acetone and then the benzol is added to further thin the material. The solid solvent is next added as a softening medium to eliminate the resinous characteristics of the gum. The silex is thoroughly mixed in the mass being added to impart the properties of a compact, incompressible mass which cuts similar to carnauba wax when slightly warm. The mixture is ground several times in a printer's ink mill to reduce all to a fine gritless mass. I prefer this finely ground silica filler as it is nonabsorbent to a high degree and does not add to the tensile strength or cause a gummy pull on the recorder point. In grinding quantities of benzol must be added to secure a varnish like consistency thin enough to spray through an air nozzle. When this mixture so thoroughly ground is applied in a film a few thousandths of an inch in thickness and the surplus solvent has been removed and the mass compacted under pressure, it loses its sticky varnish like body and acts as a synthetic wax capable of softening and later to harden to an infusible form.

Of course, the quantity of silica used depends on the reproduction and upon the operating conditions prevailing. The quantity used is so high as a rule, however, that it requires a compacting of the grinding operation to incorporate a sufficient amount in the mass. This compound coating is preferably applied to both sides of the disc-like body 2 by means of an air-spray brush, several coats being preferable to one thick coating. After the coats have been applied, the blank is preferably heated in a vacuum oven of about 120 degrees F. for 10 to 20 minutes, depending on the thickness of the coatings of the faces. After thus heating or cooking the blanks are squeezed between polished copper sheets at a pressure of about one thousand pounds to the square inch for the purpose of compacting the material of the faces and insuring the homogeneous sheeting thereof. This initial pressing or squeezing of the blanks is at an ordinary room temperature, and subsequently these blanks are pressed between similar copper sheets or plates at a temperature of about 150 degrees F. and at a pressure of about 300 pounds per square inch for a period of approximately two minutes. This will produce facings or coatings which will not boil when undergoing reaction to form an infusible mass, after the sound waves have been cut and in the subsequent treating of the blank. The above course of treatment in making this blank of Figure 1 will be found admirable for making an ordinary record. But, of course, in this art many variations may be desired in the treatment, depending upon the character of the record to be reproduced and commercially it will be found that the length of time consumed in heating, and the degrees of temperature and pressure may have to be varied to suit the peculiar characteristics of a specific line of work.

Instead of pressing between plain copper sheets to produce the smooth face, shown in Figure 1, I may press the blank between copper sheets having ribs on the surface thereof so that the blank having facial grooves as shown at 1' in Figure 2 will be produced, as will be readily understood by those skilled in the art, these grooves serving to guide the recording point within its path without requiring a special gear-driven recording tone-arm. The body section of the blank of Figure 2 which may also be of metal or porcelain is shown at 2'. After the blanks shown in Figures 1 and 2 have been produced as above described, they may be kept in stock for a long period of time without deteriorating.

In producing the master record which is indicated as an entirety by the letter M in Figure 3, the blank such as is shown in Figure 1 may be employed. This blank of Figure 1 when it is to be used in making the master record is first placed in an oven and warmed at a suitable temperature of say from 100 to 150 degrees F. in order that the phenolic faces may be softened to permit a coating of the proper wax-like consistency. I mention the above variation in temperature, because the blank may be heated to the proper consistency to give the plasticity or wax-like effect which the operator may require. If the body section 2 of the blank is made of porcelain or metal it will retain heat for a considerable period of time and consequently will maintain the phenolic faces in a soft or wax-like condition during the time which is ordinarily required to record a selection. It is to be understood that the phenolic material is a slow conductor of heat and consequently will not cool off or set to such a hard condition as to interfere with the recording operation before the selection is completed. For some work it is even possible to dispense with this preliminary heating of the prepared blank but I prefer to so heat the blanks, to avoid the production of low undertones which is likely to result if a cold blank is used. In the use of a cold blank the phenolic film will be found somewhat brittle or powdery when cut and some of the finer graduations will be lost because the cutting is not as sharp and accurate as that which occurs when the faces of the blank have been heated to the proper degree of plasticity.

The usual recorder is used, but I have found it more satisfactory if air suction is resorted to for the purpose of removing the waxy chips resulting from the cutting operation because if these chips are allowed to remain upon the blank and cool they are liable to form powdery accumulations which interfere somewhat with the working of the cutting tool. After the cutting process has been completed the record may be permitted to cool down at ordinary room temperature, and when once cooled it will be found to be sufficiently hard to permit of immediate reproduction thereby allowing the operator or performer to check up and verify the character of the work recorded. After this has been done the record is further hardened by being heated at a temperature of from 150 to 175 degrees F., and it will then be found to be hard, infusible and incompressible. Surfaces throughout will be found highly polished, the grooves clean-cut, and as this record constitutes the master record any number of casts or moldings can be made on it to reproduce the punches or matrices. In the making of the punches or matrices a separating film of graphite and gum tragacanth may be interposed between the master record and the punch or matrix blank if desired, but as the punch material is of a non-adhesive phenol, and as the coefficient of expansion of the silica used is relatively low, a ready separation may be made without the use of any intermediate separating material.

This master record in its complete form is illustrated in Figure 3.

I will now proceed to describe the making of the punch or matrix from such record.

For the material of the matrix or punch I prefer to use a blank such as is illustrated by Figure 4. This blank is formed with facings 5 of phenolic condensation product preferably reinforced by open mesh fibrous sheeting such as Yoshino paper, indicated at 6. The interior or body portion of the blank, which supports the reinforced facing, is formed of a compressible material such as laminated fibrous sheets, impregnated, but not saturated with a phenolic condensation product as indicated at 7. To equalize the stress of expansion and to eliminate the tendency of bowing or warping a phenolic backing is applied to the bottom of the blank as shown at 8. The molding or casting of the punch or matrix is done at a relatively low temperature, for instance at approximately the boiling point of water. This complete blank shown in Figure 4 has in the course of its manufacture been heated and pressed so that the phenolic condensation material thereof has been brought to a partially reacted stage, that is to say, it is relatively hard and non-flowing providing smooth polished faces, but is not so hard that it is incapable of being further treated to cause it to be slightly softened, and then to be brought to a hard and infusible state. This blank, of Figure 4, when it is to be used for the making of the punch or matrix is softened in an oven at a temperature of about 120 degrees F. In making the punch or matrix I may employ an apparatus comprising a cover portion 9 of any suitable metal, a bottom plate or support 10, also preferably of metal, and a stud 11, which passes through the usual holes in the assembled discs and is screwed into the bottom plate as at 12. One blank is placed on the stud 11 with its molding face uppermost and a heated double-faced master record M heated to a temperature of about 212 degrees F. is imposed on the blank, and then another blank is centered on the stud and placed face down against the uppermost surface of the master record. The metallic cover or sheet 9 is then applied and a pressure of approximately five hundred pounds to the square inch is exerted, the press being closed down against the bearers X. Although there is no objection to heating or cooking at the full reaction temperature of 300 to 350 degrees F., while the assembled parts are in the press, I prefer to release the pressure immediately and remove the punches or matrices from against the bottom and top faces of the master record, then placing the master record back in the press or in the oven so as to maintain it at the proper temperature. The result of the operation illustrated in Figure 5 is to produce two punches or matrices which may now be hardened to their final form through any suitable agency, such as in an oven at a temperature preferably not exceeding 270 degrees F. After the punch or matrix has been made it will appear as shown in Figure 6, the molding face thereof having ribs formed thereon as illustrated by the numeral 13.

After the punch or matrix has been properly hardened it is ready for the reproduction of the commercial records. The blanks of these records which are shown in Figure 7 are preferably composed of a body portion of laminated fibrous material indicated at 14, and impregnated but not saturated with phenolic material, this laminated fibrous structure having both faces thereof coated with a layer of phenolic condensation product shown at 15. As in the case of the punch or matrix blank, the phenolic material of this commercial record blank has been heated and treated until it is in a partially hardened and set or reacted state, so that it will have little or practically no flow, but may be softened and hardened to an infusible form under sufficient heating. In molding such a blank to produce a record one punch or matrix of Figure 6 may be locked to the lower platen with its molding face uppermost, being centered of course by the stud. The blank of Figure 7 is then imposed upon this punch or matrix being also centered by the stud. A second punch or matrix may then be placed upon and in contact with the uppermost face of the record blank so that when the latter is molded it will have selections recorded on both faces thereof. The punches are preferably heated at on operating temperature of say 212 degrees F., and the record blank interposed therebetween is likewise heated, but at a somewhat lower temperature of say 120 degrees F. This temperature softens the record blank sufficiently so that upon contact with the punches at a higher temperature the skin-like phenolic faces 15 of the blank become just plastic enough to take an impression of the punch. The press may then be closed to produce the necessary impression. It is not necessary to cool or maintain pressure for any extended length of time inasmuch as the record blanks have been compacted or pressed into sheet-like form before being used for the making of the record. Neither is it necessary to use any confining strips or side bars to prevent lateral flow or pressure. After the molding or pressing of the record blank has taken place, the parts may be dissembled and the record blank will appear as shown at R in Figure 9. It will be found at this stage that the faces of the record are hard enough for ordinary purposes, without further treatment, but should it be desirable to produce exceedingly hard infusible records, this can be done by subjecting such records after their removal from the matrix or punch to additional heat or heat and pressure.

In Figure 10 I have shown a modified form of matrix or punch. In this instance the matrix blank shown in Figure 4 has previously been coated with a metallic facing preferably a foil composed of an alloy of equal parts of tin and lead. Such a metallic-faced matrix blank may be impressed by the master record such as is shown in Figure 3 in order to produce the metal molding face shown at 16 is Figure 10. This metal-faced matrix may be used for molding a phenolic faced record such as is shown in Figure 9, or if it is desirable to produce a metal-faced record, the molding face of the matrix or punch may be coated with a metallic salt, such as copper sulphate or nickel sulphate in order to oxidize the surface. When molding the records the ammonia produced through the reaction of the phenolic material will reduce the sulphate to its metallic constituent and cause it to unite with the contacting phenolic face of the record, thereby producing a metallic-faced record. The same metallic facing can be caused to be produced upon other kinds of casting materials, other than phenolic materials, such for example as with shellac or the other fusible compounds before mentioned.

If desired, the present practice of making a wax master record may be followed and the electrotyping process practiced to produce a metallic punch or matrix, as is common in the art. From this matrix however I can produce a phenolic punch or matrix by using the matrix blank shown in Figure 4, and from which phenolic matrix any number of duplicate punches or matrices could be made. Likewise, if desired, I may apply to the ordinary wax master record a varnish-like mixture of phenolic material, through the use of a brush or the like. This varnish while on the wax master record may be dried at a temperature of 120 degrees F. in a vacuum oven so as to eliminate the solvents, thus producing a thin hard matrix shell or molding face. This shell or molding face while still upon the wax record may be united to a suitable backing, such for instance as to the blank illustrated in Figure 7, and this laminated matrix when removed from the matrix might be hardened in an oven or by other suitable agency so as to produce a single uniform, laminated, phenolic-faced record molding matrix.

By the practice of my invention I greatly reduce the number of steps and the time required in the making of phonograph records.

Furthermore, it will be noted that I may make a large number of duplicate punches or matrices in a very short time, and further that in the operation of casting or making the commercial records from these matrices, I shorten the time of operation so that a large number of punches or matrices are not required. It will also be noted that I can produce metallic-faced matrices and metallic-faced originals and duplicates without using the electrolytic bath process and without losing the details of the record grooves which results in the practice of the present methods.

As hereinbefore stated other materials than phenolic condensation products may be used for both impregnating the body structure of the fiber and for making the smooth two faces of the disc, bearing in mind that it is desirable to produce a relatively hard non-sticking coating for such disc or blanks.

While I have herein shown and described certain preferred embodiments of my invention, I wish it to be understood that I do not confine myself to all the precise details herein set forth by way of illustration, as modification and variation may be made without departing from the spirit of the invention or exceeding the scope of the appended claims.

What I claim is:

1. The step in the art of manufacturing phonographic articles which comprises providing a heat-retaining body section with a face coating of a synthetic resinous composition of approximately wax-like consistency, heating such composite blank and then cutting sound grooves in such coating.

2. The step in the art of manufacturing phonographic articles which comprises providing a porcelain body section with a face coating of a phenolic condensation product composition, heating such composite blank and then cutting sound grooves in such coating.

3. The method of manufacturing phonographic articles, which comprises providing a blank having a cementitious face of wax-like consistency which is capable of being hardened and set under heat and pressure, cutting sound grooves in said face, while the latter is in a relatively soft condition, then hardening and setting the face to provide a master record, capable of withstanding molding pressures, then subjecting a matrix-making blank having a face formed of a synthetic resinous material, capable of beind hardened and set under heat and pressure, to pressure against said master record under the action of heat to produce on the matrix blank a molding face complemental to the molding face of the master record, and finally hardening and setting the matrix thus formed.

4. The method of manufacturing phonographic articles which comprises cutting sound grooves in a blank having a cementitious face of wax-like consistency to produce a master record having sound grooves therein, hardening the said master record then subjecting a compressible blank having a skin-layer of partially hardened cementitious material to pressure against the grooved face of the master record to produce a matrix or punch having a molding face complemental to the grooved face of the master record, then placing a blank comprising a compressible body having a skin-like face of partially hardened cementitious material in face to face contact with the matrix or punch, and subjecting the same to pressure to produce in the last mentioned blank sound grooves corresponding to the grooves of the master record.

5. A phonographic master record comprising a body portion of heat-retaining material having a grooved face of a composition including a synthetic resinous material.

6. A phonographic master record comprising a body portion of porcelain and a grooved face section of a phenolic condensation product composition.

7. A phonographic punch or matrix comprising a fibrous body portion and a molding face composed of a skin-like layer of hard cementitious material having groove-molding projections formed thereon.

8. A phonographic punch or matrix comprising a body portion of compressible material and a ribbed face portion of synthetic resinous material.

9. A phonographic punch or matrix comprising a fibrous body portion impregnated with a synthetic resinous material and a molding face of layer-like structure having grooved molding ribs formed thereon.

10. A phonographic record comprising a body section composed of a plurality of united fibre sheets or laminations, and a face section united with said body section and comprising a layer of hard and set synthetic resin having sound grooves formed therein.

11. A phonographic record comprising a body portion composed of a sheet of fibre board having a hard and set synthetic resinous material incorporated therein and a skin-like face section of a hard and set synthetic resinous material having sound grooves formed therein.

12. As an article of manufacture for use in the phonographic art, a disc comprising a body portion including a synthetic resinous material, and a metallic face section therefor.

13. The method of manufacturing phonographic articles which comprises cutting sound grooves in a blank having a heat retaining body section with the body section having a cementitious face of wax-like consistency to produce a master record having sound grooves therein, hardening the said master record, then subjecting a compressible blank having a skin-like layer of partially hardened cementitious material to pressure against the grooved face of the master record to produce a matrix or punch having a molding face complemental to the grooved face of the master record, then placing a blank comprising a compressible body having a skin-like face of partially hardened cementitious material in face to face contact with the matrix or punch and subjecting the same to pressure to produce in the last mentioned blank sound grooves corresponding to the grooves of the master record.

14. The method of manufacturing phonographic articles which comprises cutting sound grooves in a blank having a cementitious face of wax-like consistency to produce a master record having sound grooves therein, hardening the said master record, then subjecting a compressible blank having a layer of partially hardened cementitious material and a surface layer of a metallic coating to pressure against the grooved face of the master record to produce a matrix or punch having a molding face complemental to the grooved face of the master record, then coating the matrix with a metallic salt and placing a blank comprising a compressible body having a skin-like face of partially hardened cementitious material in face to face contact with the coated matrix or punch and subjecting the same to pressure to produce in the last mentioned blank a metallic facing and sound grooves corresponding to the grooves of the master record.

15. The method of manufacturing phonographic articles which comprises providing a blank having a cementitious face of wax-like consistency which is capable of being hardened and set under heat and pressure, cutting sound grooves in said face while the latter is in a relatively soft condition, and then hardening or setting the face to provide a master record capable of withstanding molding pressures, then subjecting a matrix making blank having a fibrous body portion and a face formed of a synthetic resinous material capable of being hardened and set under heat and pressure to pressure against said master record under the action of heat to produce on the matrix blank a molding face complemental to the molding face of the master record, and finally hardening and setting the matrix thus formed.

Signed at city of Philadelphia, in the county of Philadelphia and State of Pennsylvania, this 21st day of January, A. D. 1920.

EMIL E. NOVOTNY.